US008356192B2

(12) United States Patent
Chen et al.

(10) Patent No.: US 8,356,192 B2
(45) Date of Patent: *Jan. 15, 2013

(54) METHOD AND DEVICE FOR POWER MANAGEMENT AND CONTROL OF ADVANCED TELECOM COMPUTING ARCHITECTURE SYSTEM

(75) Inventors: Cheng Chen, Shenzhen (CN); Feng Hong, Shenzhen (CN); Shanfu Li, Shenzhen (CN); Jianhua Pan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/432,944

(22) Filed: Mar. 28, 2012

(65) Prior Publication Data

US 2012/0185707 A1      Jul. 19, 2012

Related U.S. Application Data

(63) Continuation of application No. 12/408,429, filed on Mar. 20, 2009, now Pat. No. 8,209,556, which is a continuation of application No. PCT/CN2007/070743, filed on Sep. 20, 2007.

(30) Foreign Application Priority Data

Sep. 21, 2006    (CN) .......................... 2006 1 0159418

(51) Int. Cl.
*G06F 1/26*        (2006.01)

(52) U.S. Cl. ...................................... 713/300; 713/310

(58) Field of Classification Search .................. 713/300, 713/310, 340
See application file for complete search history.

(56) References Cited

U.S. PATENT DOCUMENTS

| | | | |
|---|---|---|---|
| 6,101,108 A | 8/2000 | Wittenbreder, Jr. | |
| 6,448,672 B1 | 9/2002 | Voegeli et al. | |
| 6,928,560 B1 | 8/2005 | Fell, III et al. | |
| 8,209,556 B2 * | 6/2012 | Chen et al. ................. | 713/300 |
| 2004/0025064 A1 | 2/2004 | Felsman | |
| 2004/0105283 A1 | 6/2004 | Schie et al. | |
| 2004/0122985 A1 | 6/2004 | Parra et al. | |

(Continued)

FOREIGN PATENT DOCUMENTS

CN       1690895 A      11/2005

(Continued)

OTHER PUBLICATIONS

State Intellectual Property Office of the People's Republic of China, Written Opinion of the International Searching Authority in International Application No. PCT/CN2007/070743 (Jan. 24, 2008).

(Continued)

*Primary Examiner* — Paul Yanchus, III
(74) *Attorney, Agent, or Firm* — Leydig, Voit & Mayer, Ltd.

(57) ABSTRACT

An Advanced Telecom Computing Architecture system and a method for power management and control of the system are disclosed. The system includes a Front Board (FRB) and a Rear Transition Module (RTM)/Front Transition Module (FTM). The FRB includes a first power conversion/control module that supplies power to the FRB and RTM/FTM. The system further includes a control circuit that outputs control signal, and a second power conversion/control module that supplies power to the RTM/FTM according to the control signal.

8 Claims, 11 Drawing Sheets

U.S. PATENT DOCUMENTS

| | | | |
|---|---|---|---|
| 2005/0219825 | A1 | 10/2005 | Campini et al. |
| 2005/0276269 | A1 | 12/2005 | Kim |
| 2006/0067063 | A1 | 3/2006 | Stahl |
| 2007/0070566 | A1 | 3/2007 | Campini et al. |

FOREIGN PATENT DOCUMENTS

| | | | |
|---|---|---|---|
| CN | 1780348 | A | 5/2006 |
| WO | WO 9607960 | A1 | 3/1996 |

OTHER PUBLICATIONS

United States Patent and Trademark Office, 1$^{st}$ Office Action in corresponding U.S. Appl. No. 12/408,429 (Jul. 21, 2011).

United States Patent and Trademark Office, 2$^{nd}$ Office Action in corresponding U.S. Appl. No. 12/408,429 (Jan. 10, 2012).

European Patent Office, Extended European Search Report in European Application No. 07816934.9 (Jan. 12, 2010).

European Patent Office, 1$^{st}$ Office Action in European Application No. 07816934.9 (Sep. 30, 2010).

State Intellectual Property Office of the People's Republic of China, 1$^{st}$ Office Action in Chinese Application No. 200780000302.7 (Nov. 6, 2009).

PCI Industrial Computers, "Advanced TCA®, PICMG®, 3.300 Revision 0.1 AdvancedTCA® 300, Based Specification," Draft 0.2, Draft Specification for Review Only (Nov. 10, 2005).

PCI Industrial Computers, "Advanced TCA®, PICMG®, 3.0 Revision 2.0 AdvancedTCA® Base Specification," ECN-002, Pages changed in PICMG® 3.0 R2.0 AdvancedTCA® Base Specification compared to PICMG® 3.0 R2.0 ECN-002 as of May 26, 2006.

PCI Industrial Computers, PICMG 3.0, "Advanced Telecommunications Computing Architecture (ATCA)," Draft Specification, Version D1.0 (Dec. 18, 2002).

PCI Industrial Computers, "AdvancedTCA PICMG 3.0 Short Form Specification," XP002561594 (Jan. 31, 2003).

1$^{st}$ Office Action in corresponding Chinese Patent Application No. 200610159418.2 (Apr. 4, 2008).

* cited by examiner

METHOD AND DEVICE FOR POWER MANAGEMENT AND CONTROL OF ADVANCED TELECOM COMPUTING ARCHITECTURE SYSTEM

CROSS-REFERENCE TO RELATED APPLICATIONS

This application is a continuation of U.S. patent application Ser. No. 12/408,429, filed on Mar. 20, 2009, which is a continuation of International Application No. PCT/CN2007/070743, filed on Sep. 20, 2007. The International Application claims priority to Chinese Patent Application No. 200610159418.2, filed on Sep. 21, 2006, all of which are hereby incorporated by reference in their entireties.

FIELD

The present invention relates to a technology of power control for a telecommunication device, and more particularly, to a method and device for power management and control of an Advanced Telecommunication Computing Architecture (ATCA) system.

BACKGROUND

ATCA is an open industrial standard architecture stipulated and developed by the PCI Industrial Computer Manufacturers' Group, and is designed as universal hardware platform technologies for both telecom devices and computing servers. Various telecom devices and computing servers that meet different requirements can be built by various modules based on the ATCA standard. ATCA generally refers to the PICMG 3.x series standards, including specifications of shelf structure, power source, heat dispersion, single board structure, backplane interconnection topology, system management, switch network proposals, etc. ATCA in broad sense includes specifications made by PICMG, such as ATCA, ATCA 300 and MicroTCA.

Intelligent Platform Management Interface (IPMI) specification is an intelligent platform management interface standard proposed by some big computer communication companies for improving servers' usability, which is to provide the servers with functions like device management, sensor/event management, user management, fan shelf/power shelf management, remote maintenance, etc.

PICMG 3.0 defines the IPMI specification as a management specification that ATCA abides by. A block diagram of the principle of single board power control based on IPMI management specification is shown in FIG. 1, in which Intelligent Platform Management Controller (IPMC) and Intelligent Platform Management Bus (IPMB) are both management components defined in the IPMI specification. The power conversion/control module is configured to receive backplane power input and complete conversion of management power and load power that the board needs, where the management power is supplied to management related circuits like IPMC, etc., and the load power is supplied to the load circuit. After the single board is plugged into the backplane, the power conversion/control module does not supply a management power under control; the IPMC is powered on and starts to work normally. At this moment, the load power is not supplied. When certain conditions are met, the single board IPMC communicates with Shelf Manager via Intelligent Platform Management Bus (IPMB); after getting permission from the Shelf Manager, the single board IPMC enables the ENABLE signal of the load power of the power conversion/control module, which in turn supplies load power to the load circuit.

The structure of an ATCA single board is shown in FIG. 2. The ATCA specification defines two types of single boards: Front Board (FRB) and Rear Transition Module (RTM). The connector at the backplane side of the ATCA single board is divided into three zones: Zone 1, Zone 2, and Zone 3. The Zone 1 connector provides power and management plane signals for the front board. The Zone 2 connector provides the Front Board with control plane signal, data plane signal and clock signal. The Zone 3 connector is used for user-customized connections. The front board is plugged into the ATCA shelf from its front, and is connected to the backplane via the Zone 1 and Zone 2 connectors, including the connection of a power source with a signal. The Rear Transition Module is plugged into the ATCA shelf from its back, and is connected to the corresponding Front Board via the Zone 3 connector, including the connection of the power source with the signal.

In FIG. 2, two handles, a top handle and a bottom handle, for facilitating the plugging/unplugging of the single board, are installed on both the FRB and the RTM. A handle switch is mounted at the position of the bottom handle of the Front Board. The handle switch is in different states when the bottom handle is opened or closed. The IPMC on the FRB can recognize whether the bottom handle is open or closed by detecting the state of the handle switch signal that is coupled to the handle switch. The transition of the handle state is a key element in the transition of operating states of an ATCA single board.

The ATCA single board has different operating states during its operation. FIG. 3 shows the transition of the operating states of the ATCA single board. As shown in FIG. 3, the single board is in M0 state when it is not completely plugged into the ATCA shelf backplane. The board is in M1 state when it is completely plugged into the backplane but the handle is not closed, at which moment management power is supplied to the single board, related circuits like the IPMC, etc., are powered on and start to work, while load power is not supplied, and the single board is not activated. After the handle is closed, the single board enters M2 state, IPMC detects, via the handle switch signal, that the handle is closed, and starts to announce to the Shelf Manager that the single board is in position, and requests the shelf manager to activate the single board, when the request is permitted, the board enters M3 state; in M3 state, IPMC negotiates power with Shelf Manager, after getting permission from the shelf manager, IPMC controls the power conversion/control module to supply a load power, the other parts of the single board are powered normally; after the single board is activated, it enters M4 state, i.e. its normal operating state. Unplugging of the single board is the reverse of the plugging. In the unplugging process, the transition of the handle state is also a key element in the transition of operating states of the single board.

FIG. 4 is a block diagram of power supply to the RTM in the present ATCA system. The RTM power is supplied by the load power branch which is supplied by the FRB power conversion/control module, and via Zone 3 connector to the RTM circuits, which include an RTM management circuit and an RTM load circuit. The processes of plugging/unplugging and powering-on of the RTM are as follows:

In the process of hot swap of the single board, it is necessary to avoid current rushes. The RTM current supplied by the FRB via Zone 3 connector to the RTM is relatively high, and therefore, the RTM power supply needs to be cut off while the RTM is plugged in. One way is to plug in the FRB before plugging in the RTM. Other way is to plug in the RTM first with the handle open, at this moment, since the IPMC of the FRB does not detect that the handle is closed, it stays in M1 state; the power conversion/control module does not supply load power, and therefore the RTM is not supplied with power. After the plugging and connection of the FRB and RTM are completed, the handle of the FRB is closed, and the IPMC starts to communicate with the Shelf Manager via the IPMB. During the power negotiation process, the IPMC considers requests for power supply, from both the FRB and RTM, after getting permission from the shelf manager, it enables the load power "enabled" signal of the power conversion/control module to permit it to supply the load power, and meanwhile the RTM also obtains its power supply. In the process of unplugging the RTM, the FRB handle needs to be opened first, the single board should be deactivated according to the deactivation steps described in FIG. 3, and the RTM can be normally unplugged, only after both the FRB load power and the RTM power supply are cut off.

The ATCA300 standard defines a telecommunication hardware platform architecture, which is stipulated by the PICMG based on the ATCA standard for 300 mm-depth cabinets. In order to meet installing requirements of 300 mm-depth cabinets, in the ATCA 300 standard, some modification is made on the size of the FRB; the RTM in the ATCA standard is removed; and a Front Transition Module (FTM) that has similar applications to the RTM is added. In the ATCA 300, the FRB and FTM are connected with the backplane via the Zone 3 connector of the FRB and the Zone4 connector of the FTM, as shown in the ATCA 300 board scheme of FIG. 5.

As shown in FIG. 5, the FTM is substantially similar to the RTM in the ATCA, except for its location in the shelf and the connection with the FRB. The power management for the FTM is also the same as that for the RTM, which is not elaborated here. In order to simplify the description, the RTM/FTM is used to represent the RTM or FTM in this description.

The FRB power conversion/control module supplies the FRB load power and RTM/FTM power, and does not support independent and flexible management and control of power supply of the RTM/FTM, or hot swap. That is, in the process of plugging/unplugging the RTM/FTM, the FRB load power needs to be cut off, which interrupts the operation of the FRB.

Additionally, in general, the FRB presets the RTM/FTM power supply according to the design of the RTM. Therefore, the power may not be utilized efficiently according to the actual power consumption of the different RTM/FTMs plugged; and the power resource is wasted.

SUMMARY

Embodiments of the present invention provide an ATCA system and a method for managing and controlling a power supply of an ATCA system, which can realize independent management and control on a power supply of RTM/FTM of the ATCA.

The ATCA system includes: a Rear Transition Module (RTM)/Front Transition Module (FTM); a Front Board (FRB), including a first power conversion/control module that provides a power to the FRB and the RTM/FTM; a control circuit, adapted to output a control signal; and a second power conversion/control module, adapted to provide a power to the RTM/FTM according to the control signal.

According to another aspect of the present invention, a method for managing and controlling a power supply of an Advanced Telecom Computing Architecture system, the system includes an FRB and an RTM/FTM, the FRB supplies a power to the RTM/FTM, and a control circuit, adapted to output control signal. The method includes: receiving the control signal; and supplying the power supplied by the FRB to the RTM/FTM, according to the control signal.

According to the technical solutions, in the ATCA system, the supplying power to the RTM/FTM is controlled by the control signal, and only when the control signal permit supplying a power, the power is supplied to the RTM/FTM. Therefore, with the embodiments of the present invention, the supplying power to the RTM/FTM can be independently controlled.

DETAILED DESCRIPTION

Embodiments of the present invention will be described with reference to the drawings.

According to the embodiments of the present invention, in the ATCA system, the power supplied to the RTM/FTM is divided to obtain a load power, so that the supply of the load power having a big current is controlled by a control signal; only when the control signal permits supplying the load power, the load circuit of the RTM/FTM is powered, to realize independent supply and control of the load power of the RTM/FTM, and to support hot swap of the RTM/FTM without interfering with normal operation of the FRB.

Figure 1:
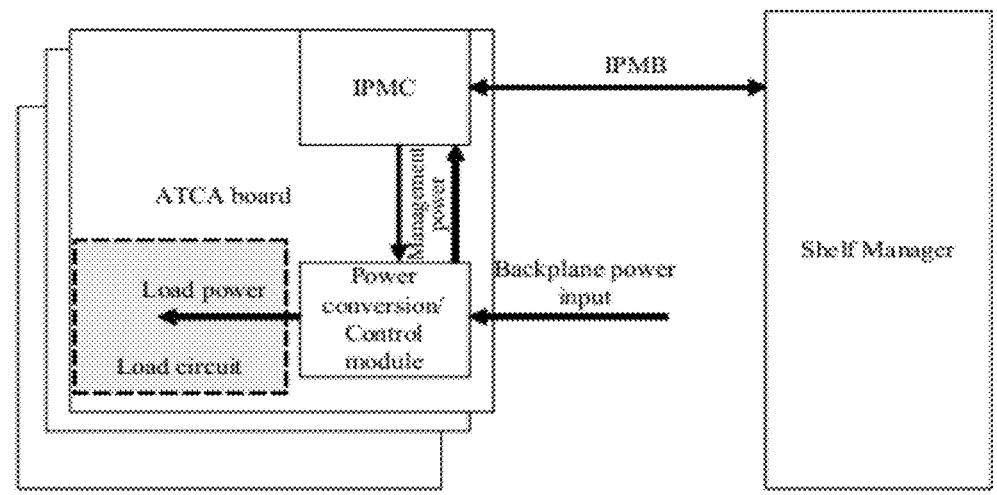
FIG. 1 shows power management and control of ATCA single board in the prior art.
Figure 2:
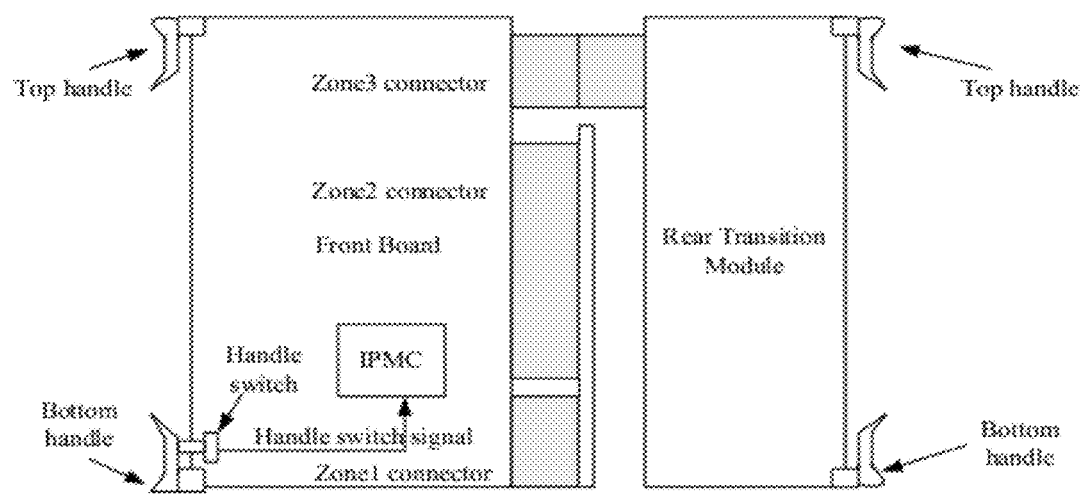
FIG. 2 shows FRB and RTM of ATCA in the prior art.
Figure 3:
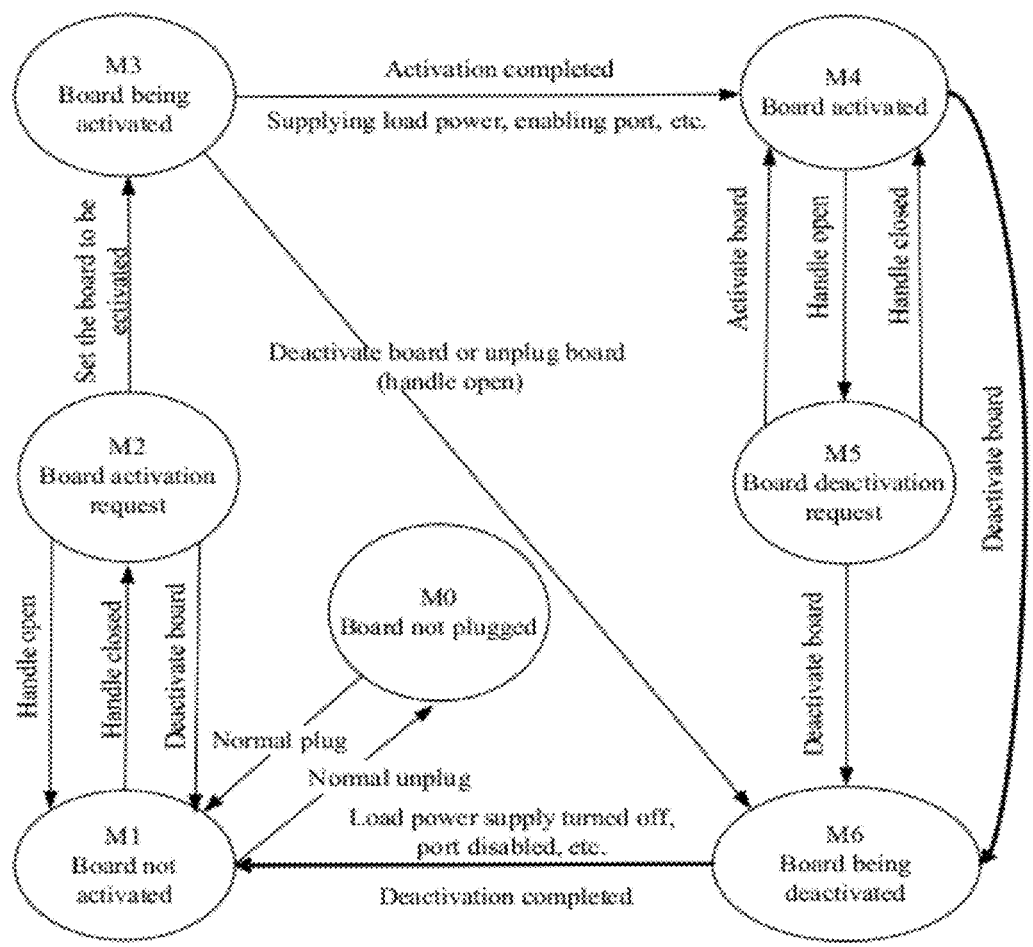
FIG. 3 shows operating state transition of ATCA single board in the prior art.
Figure 4:
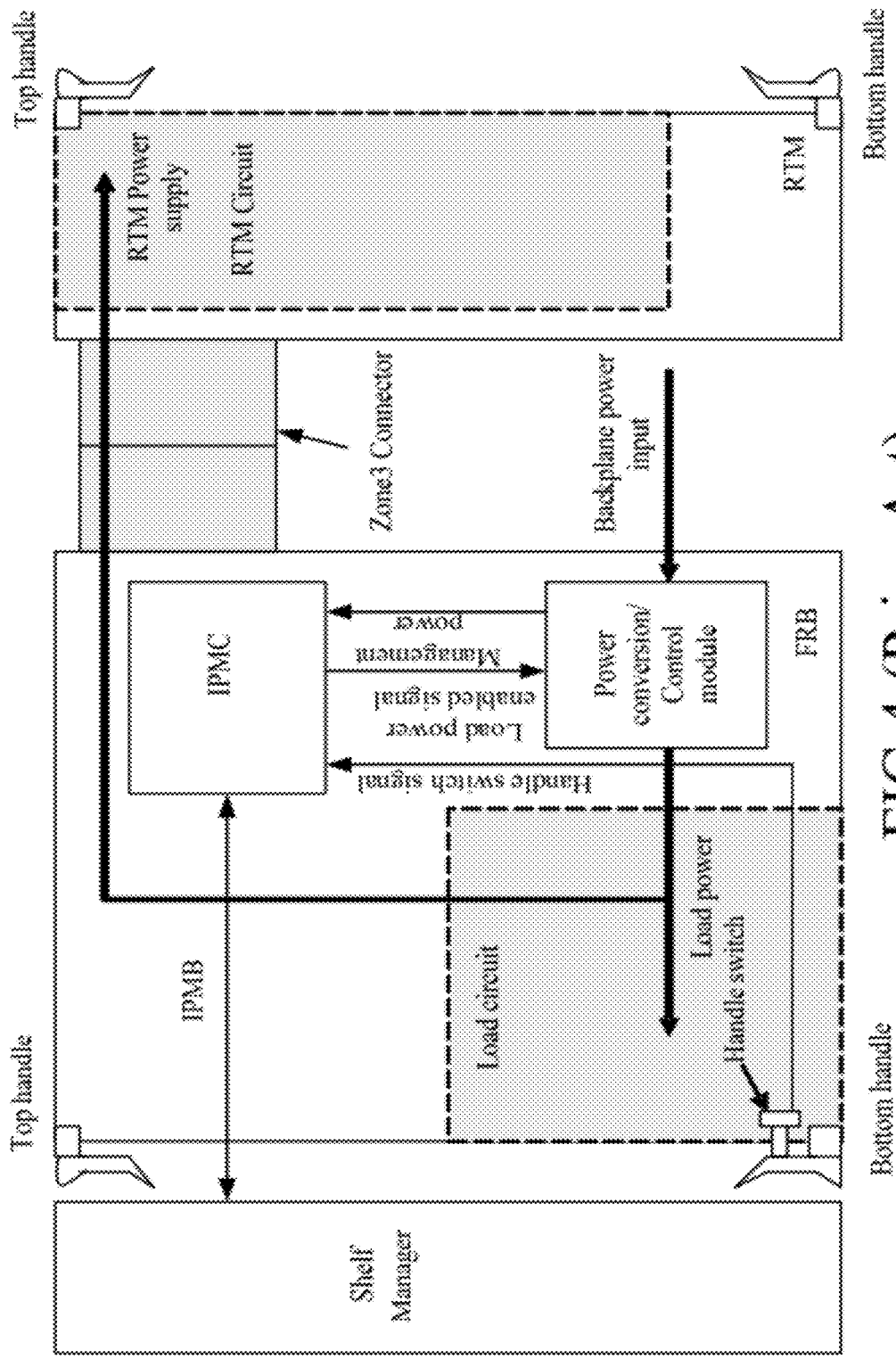
FIG. 4 shows the supplying power to the RTM of ATCA in the prior art.
Figure 5:
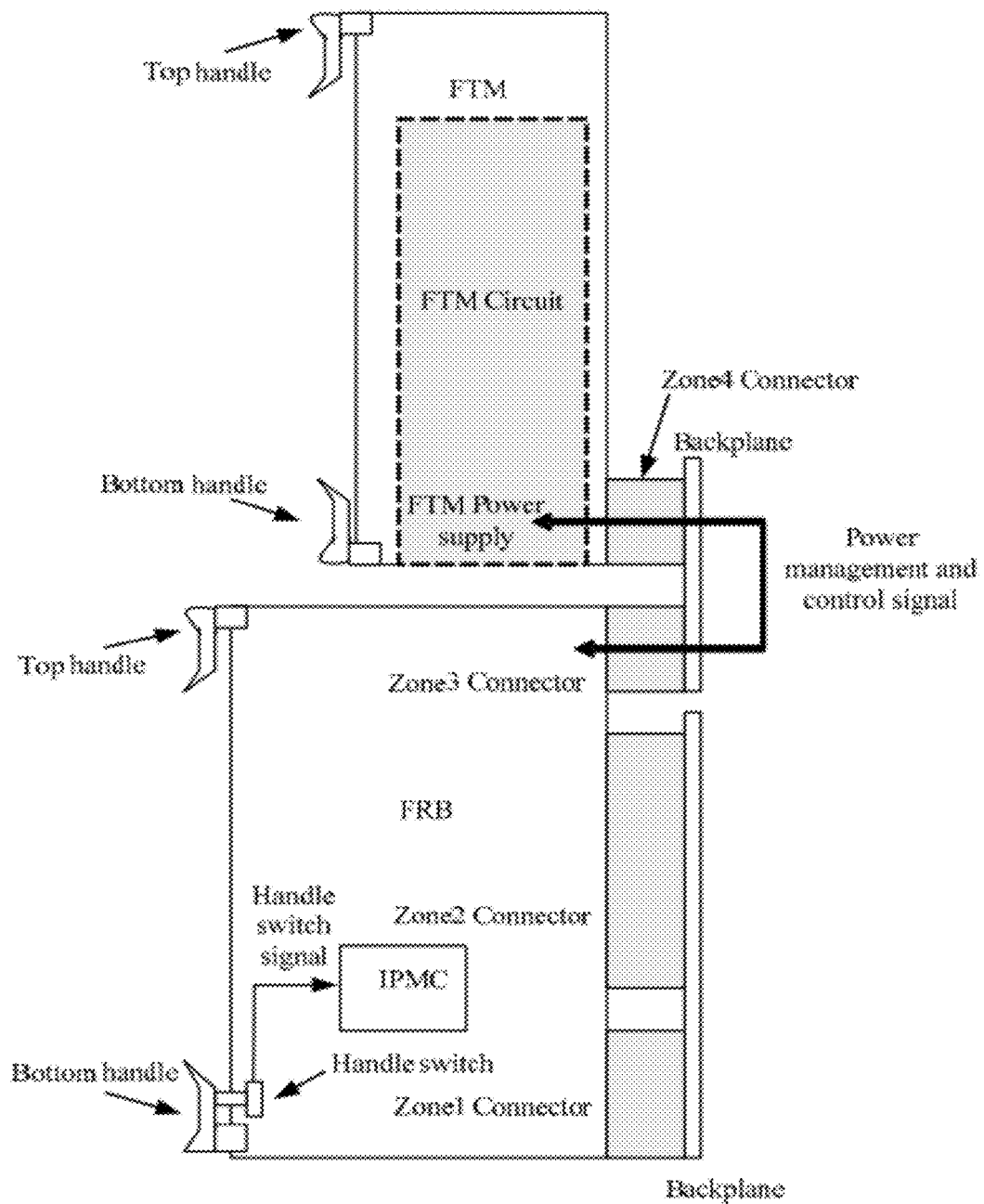
FIG. 5 is an exemplary schematic diagram of an ATCA300 board in the prior art.
Figure 6:
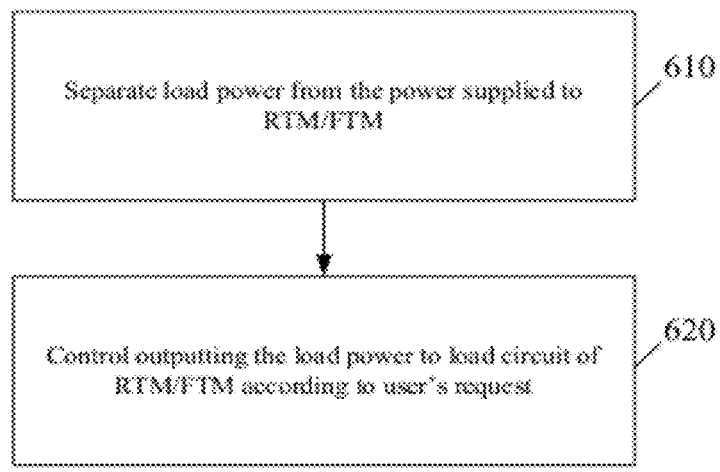
FIG. 6 is a general exemplary flowchart of a method for power management and control of an ATCA system according to an embodiment of the present invention.

FIG. 6 is a general exemplary flowchart of a method for power management and control of an ATCA system according to an embodiment of the invention. As shown in FIG. 6, the method includes:

Step 610: A load power from the power supplied to RTM/FTM is separated.

Step 620: The supplying the load power to a load circuit of RTM/FTM is controlled according to a user request.

Figure 7:
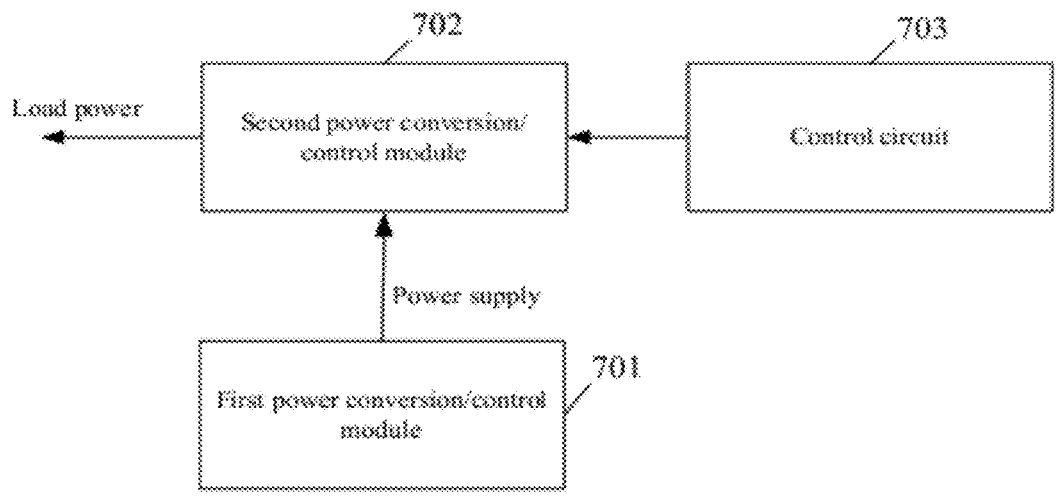
FIG. 7 is a general exemplary structure diagram of a device for power management and control of an ATCA system according to an embodiment of the present invention.

FIG. 7 is a general exemplary structure diagram of a device for power management and control of an ATCA system according to an embodiment of the invention. As shown in FIG. 7, the device includes a first power conversion/control module 701, a second power conversion/control module 702, and a control circuit 703.

In this device, the first power conversion/control module 701 is adapted to supply the load power to the FRB and a power to the RTM/FTM. The second power conversion/control module 702 is adapted to receive the power supplied to RTM/FTM, and supplying the load power to RTM/FTM under the control of the control circuit 703 according to a user request. The control circuit 703 is adapted to receive the user request, and send control signal to the second power conversion/control module 702 according to the request, to control the supply of the load power.

The above recites generally the method and devices for ATCA system power management and control according to the embodiments of the present invention. More details about implementations of the present invention are given by reference to the following embodiments.

As the compositions of the RTM and FTM are very similar, and the modules involved in the embodiment of the present invention have the same composition, for example, the RTM will be used for illustrating the detailed implementations of the present invention. In the following embodiment, the original power conversion/control module in the FRB is the first power conversion/control module 701 of the device shown in FIG. 7.

First Embodiment

In this embodiment, the second power conversion/control module is added in a single board and is provided in the RTM, and is referred to as a power conversion/control module. A handle switch is installed at the bottom handle of the RTM, to control the supplying power to the load circuit of the RTM.

Figure 8:
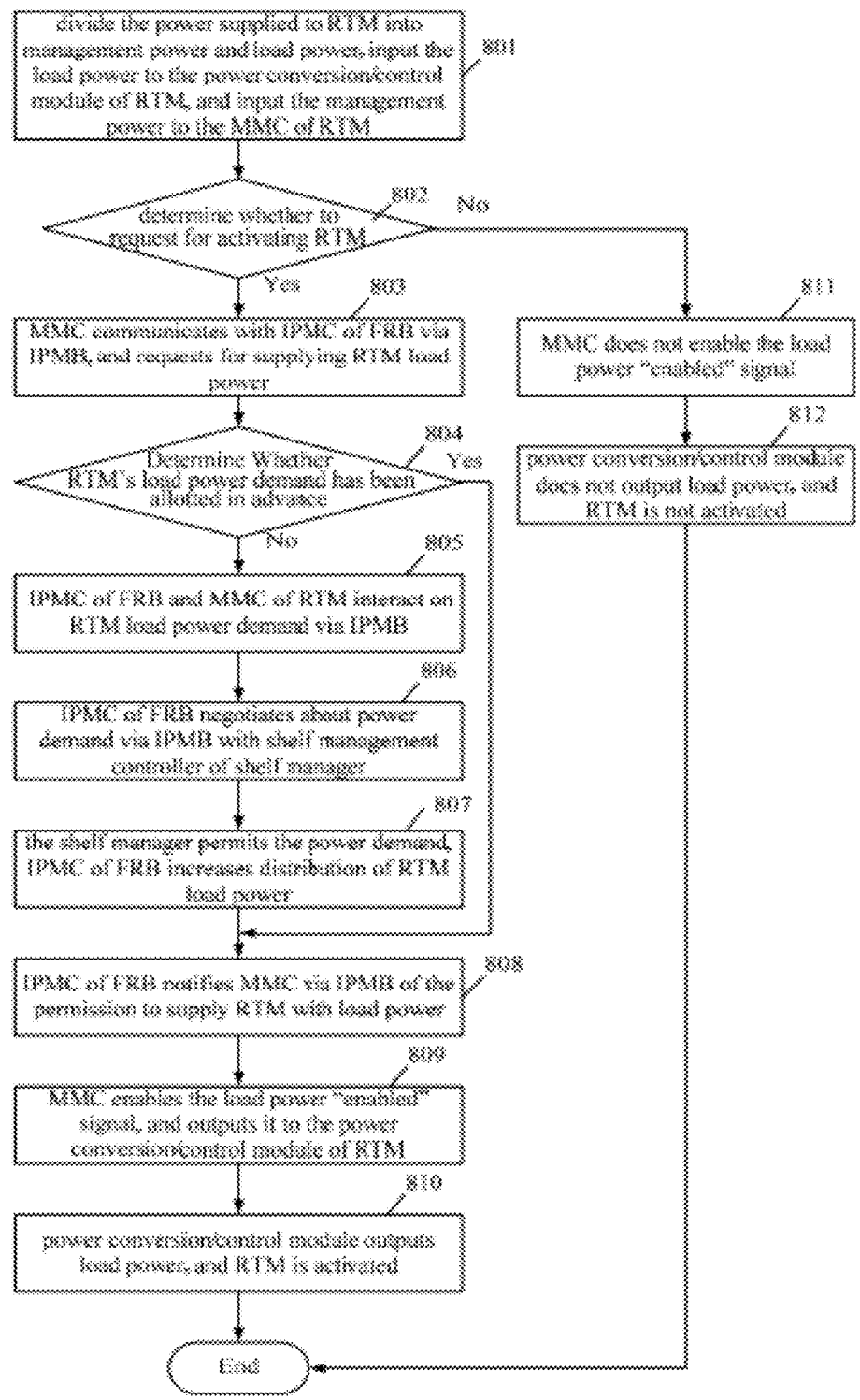
FIG. 8 is a flowchart of a method for power management and control for the ATCA system according to a first embodiment of the present invention.

FIG. 8 is a flowchart of a method for power management and control of the ATCA system according to the first embodiment of the present invention. As shown in FIG. 8, the method includes:

Step 801: The power supplied to the RTM is divided into a management power and a load power, the load power is input to the power conversion/control module of the RTM, and the management power is input to a Module Management Controller (MMC) of the RTM.

Step 802: The MMC of RTM determines whether to request for activating the RTM according to a user request. If yes, step 803 and its following steps are executed; otherwise step 811 and its following steps are executed.

In this step, the MMC determines whether to request for activating the RTM according to a user request, including that: by detecting the handle switch signal coupled to the handle switch, the MMC can recognize an open/close state of the bottom handle; in this embodiment, the bottom handle being closed indicates that the RTM is requested to be activated, i.e., the load circuit of the RTM needs to be supplied with the load power, and the bottom handle being open indicates the RTM is not requested to be activated, i.e., the load circuit of the RTM does not need to be supplied with the load power.

Step 803: The MMC communicates with the IPMC of the FRB via the IPMB, and requests for supplying the load power to the RTM.

Step 804: The IPMC of the FRB determines whether the load power demand of the RTM has been allotted in advance. If yes, step 808 and its following steps are executed; otherwise step 805 and its following steps are executed.

In this embodiment, the load power "enabled" signal is a control signal that controls the power conversion/control module to supply a load power. When it is enabled, it is indicated that the power conversion/control module is permitted to supply the load power; otherwise, the module is not permitted to supply the load power.

Step 805: The IPMC of the FRB and MMC of the RTM interact on the load power demand of the RTM via the IPMB.

In the step, as the IPMC of the FRB does not determine the demand of the RTM on the load power in advance, both of them interact on the load power demand in this step.

Step 806: the IPMC of the FRB negotiates about the power demand via the IPMB with the shelf management controller of the shelf manager.

In this step, the IPMC of the FRB negotiates about the power demand with the shelf manager once again, based on requirement data for the load power of the RTM which is obtained through the interaction with the MMC of the RTM.

Step 807: The shelf management controller of the shelf manager permits the power demand, and the IPMC of the FRB increase distribution of the load power of the RTM.

Step 808: The IPMC of the FRB notifies the MMC via the IPMB of the permission to supply the RTM with the load power.

Step 809: The MMC enables the load power "enabled" signal, and outputs it to the power conversion/control module of the RTM.

Step 810: The power conversion/control module supplies the load power, the RTM is activated, and the process is terminated.

Step 811: The MMC does not enable the load power "enabled" signal.

Step 812: The power conversion/control module does not supply the load power, the RTM is not activated, and the process is terminated.

As can be seen from the above process of method, steps 802-812 are detailed operations of step 620 in the general process of the method shown in FIG. 6. In this embodiment, it is determined whether the power conversion/control module of the RTM is permitted to supply the load power, according to the state of the handle switch and the result of interaction with the IPMC, so as to control the output of the big load current. Additionally, in this embodiment, the load power demand of the RTM is determined, based on the negotiation between the IPMC and MMC, which helps to improve the exploitation efficiency of the shelf power.

As a matter of fact, in actual practices, whether the RTM is permitted to be supplied with the load power may also be determined by the MMC, based only on the state of the handle switch. In this case, when, at first, FRB negotiated about the power with the shelf manager, the negotiation needs to include the negotiation about the load power of the RTM. The operations of steps 803-808 may be omitted; and steps 809-810 may be executed if the signal received in step 802 requests for activating the RTM.

In this embodiment, the manner of determining whether the RTM is required to be activated based on a user request is to sense the user request by the handle switch. There are also other manners to perform the function, for example, a manner of the user inputting a control command to the IPMC of the FRB to request for activating the RTM. In this case, steps 803-808 can be omitted.

The above is the process of the method for power management and control of the ATCA system according to this embodiment. This embodiment also provides a device for power management and control of the ATCA system which can implement the above method.

Figure 9:
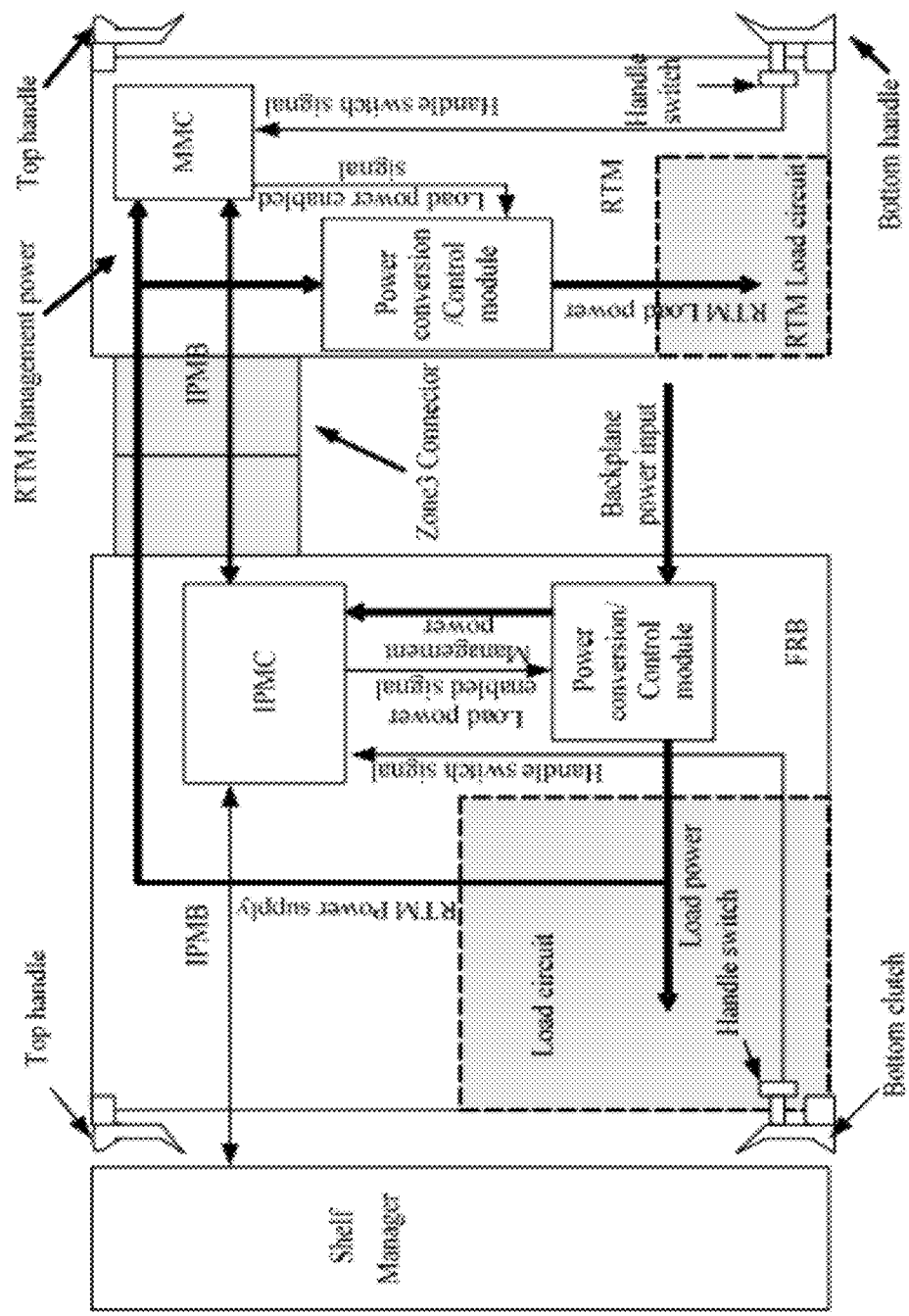
FIG. 9 is a structure diagram of a device for power management and control for the ATCA system according to the first embodiment of the invention.

FIG. 9 is a structure diagram of a device for power management and control of the ATCA system according to the first embodiment. As shown in FIG. 9, the device includes an FRB, an RTM, and a shelf manager. The FRB includes an IPMC, a power conversion/control module, a handle switch, a load circuit, and a Zone 3 connector. The RTM includes an MMC, a power conversion/control module, a handle switch, a load circuit and a Zone 3 connector. The power conversion/control module in the RTM is an implementation of the second power conversion/control module 702 of the device shown in FIG. 7. The MMC and handle switch constitute the control circuit 703 of the device shown in FIG. 7.

In this device, the load power supplied by the power conversion/control module of the FRB is divided to form an RTM power supply which is supplied to the RTM via the Zone 3 connector. After entering the RTM, the power is divided into RTM management power and RTM load power. The RTM management power is supplied, without control, to management related circuits of the RTM such as the MMC. The RTM load power is supplied to a load circuit of the RTM after passing through the power conversion/control module added on the RTM. The supply of the load power is controlled by the MMC. The control signal is a load power "enabled" signal output from the MMC to the power conversion/control module of the RTM. Only when the MMC has enabled the load power "enabled" signal of the power conversion/control module in the RTM, can the load circuit of the RTM can obtain the RTM load power. Additionally, whether the MMC outputs the load power "enabled" signal is controlled based on the detection of the handle switch signal coupled to the handle switch by the MMC. The handle switch may be installed at the top handle or the bottom handle of the RTM. The MMC in the RTM can recognize the open/close state of the handle by detecting the handle switch signal, and then can determine whether to output the load power "enabled" signal based on the state of the handle.

In this device, the supply of the load power in the power conversion/control module in the RTM may also be controlled with the assistance of I the PMC. That is, the MMC, the handle switch, and the IPMC altogether constitute a control circuit of the system shown in FIG. 7. In this case, in the process of operating state transition of the RTM, the MMC communicates with the IPMC of the FRB via the IPMB provided by the Zone 3 connector, and determines whether to output the load power "enabled" signal based on the result of the communication.

In the above device embodiment, the management power of the RTM is obtained by dividing the load power supplied by the power conversion/control module of the FRB. In actual practices, the management power may also be obtained by dividing the management power supplied by the power conversion/control module of the FRB, and is supplied to the MMC of the RTM via the Zone 3 connector.

In the device shown in FIG. 9, user request information is provided by the state of the handle switch, and it can also be provided in the way that a user inputs a control command to the IMPC. In this case, the control circuit 703 of the device shown in FIG. 7 is constituted by the IPMC and MMC of the device shown in FIG. 9. The user request information is sent to the MMC by the IPMC before the MMC controls the supply of the load power in the power conversion/control module of RTM based on the user request.

With the above method and device, the RTM can be plugged/unplugged in the case of the FRB operating normally. The detailed process of the plugging/unplugging is described as follows.

(I). Plug in the RTM when the FRB operates normally.

1. The RTM is plugged in the slot position, management related circuits of the RTM, including the MMC, are supplied with the RTM management power and are powered normally, while a load circuit of the RTM is not supplied with the load power of the RTM, and the RTM is in the M1 state of the single board being inactivated.

2. The handle of the RTM is closed; after the MMC of the RTM detects that the handle is closed, it communicates with the IPMC of the FRB via the IPMB, interacts on operating state management of the RTM, and requests to supply the RTM load power.

3. If FRB is plugged into the ATCA shelf initially, and an intelligent management controller of the FRB negotiates about power demand with the shelf management controller, the load power demand of the plugged RTM is allotted in advance, then the process skips to step 4; otherwise, the MMC of the RTM needs to interact about the load power demand of the RTM with the IPMC of the FRB via the IPMB. Based on the load power demand data for the RTM, the IPMC of FRB negotiates via the IPMB with the shelf management controller about the power demand, again, and increase distribution of the RTM load power upon getting permission from the shelf management controller.

4. After getting permission from the IPMC of the FRB, the MMC of the RTM enables the load power "enabled" signal of the power conversion/control module of the RTM, the RTM load power is supplied normally, the RTM load circuit obtains the supply of the RTM load power, the RTM is activated and enters M4 state of normal operation.

In the above process of plug in the RTM, steps 2-3 may be altered as: a user inputs to IPMC a control command that requests for activating the RTM, the IPMC interacts via the IPMB with the MMC about operating state management of the RTM.

(II). Unplug the RTM when both the FRB and RTM operate normally.

1. The handle of the RTM opens, the MMC of R the TM communicates via I the PMB with the IPMC of the FRB about operating state management of the RTM, and request for unplugging the RTM.

2. After getting permission from the IPMC of the FRB, the MMC of the RTM controls the power conversion/control module of the RTM with the load power "enabled" signal of the RTM, turns off the supply of the RTM load power, and the RTM enters M1 state of single board being inactivated. If necessary, at this time, the IPMC of the FRB can also negotiate with the shelf management controller via the IPMB about the power demand, and release the load power demand of the RTM, so as to improve the exploitation efficiency of the shelf power resource.

3. Unplug the RTM.

As can be seen from the above, by implementing the method and device of the embodiment, the RTM management power and the RTM load power are separated, so that the RTM load power having a big current is supplied under control, and can be turned off while the RTM is being plugged/unplugged, to support the hot swap of the RTM. Additionally, the method and device of the embodiment also supports negotiation about load power demand of the RTM in the process of plugging/unplugging the RTM, which achieves distribution and release of the power resource engaged by the RTM load power, and improves the exploitation efficiency of power supply.

Second Embodiment

In this embodiment, the second power conversion/control module added in the single board is provided in the FRB, and is referred to as a load power conversion/control module of the RTM. A handle switch is added at the top handle of the RTM to control whether to supply power to the load circuit of the RTM.

Figure 10:
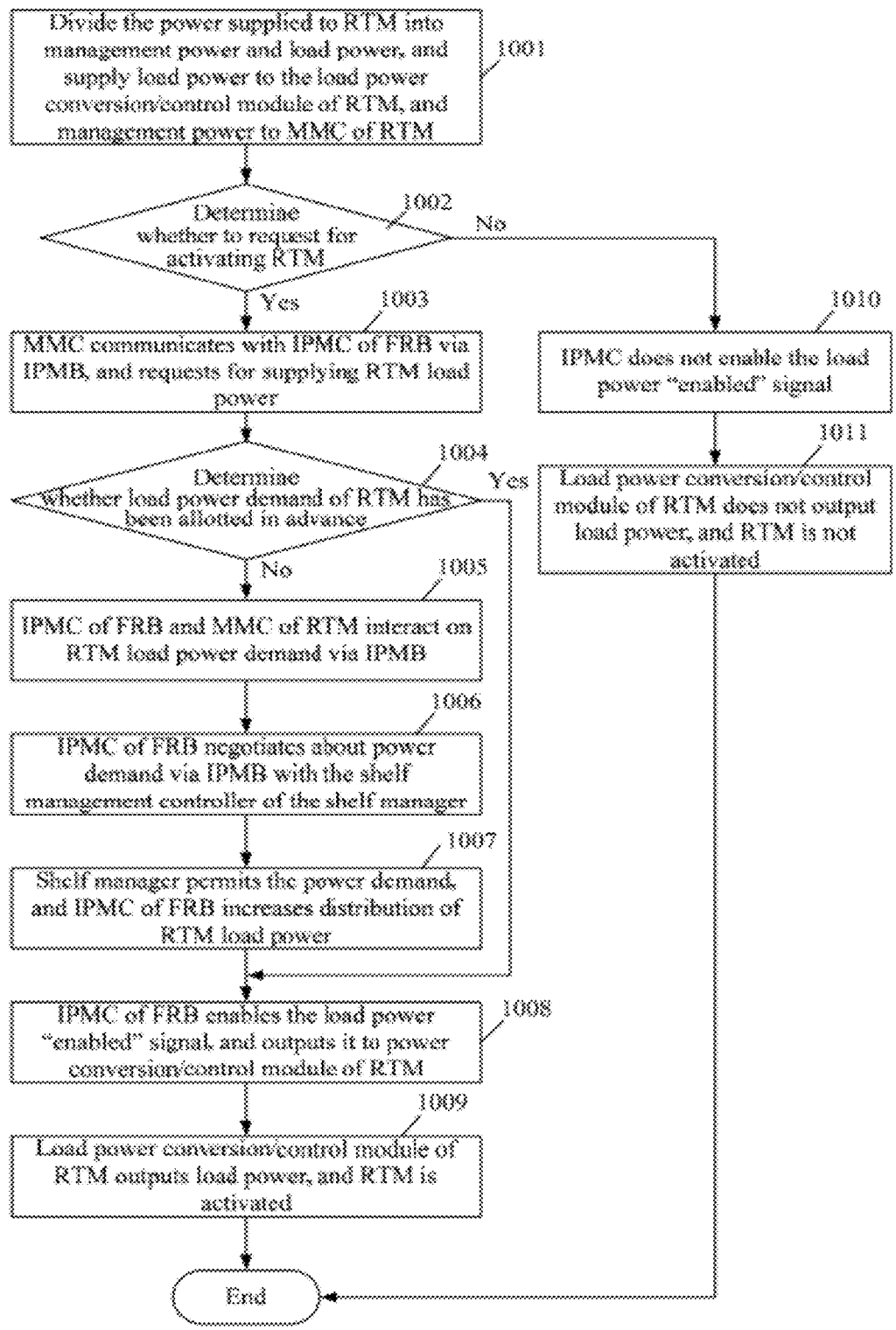
FIG. 10 is a flowchart of a method for power management and control for RTM of the ATCA according to a second embodiment of the present invention.

FIG. 10 is a flowchart of the method for power management and control of the ATCA system of the second embodiment. As shown in FIG. 10, the method includes:

Step 1001: The power supplied to the RTM is divided into management power and load power, and the load power is input to the load power conversion/control module of the RTM, and the management power is input to the MMC of the RTM.

Step 1002: The MMC of the RTM determines whether to request for activating the RTM based on a user request. If yes, step 1003 and its following steps are executed; otherwise step 1010 and its following steps are executed.

In this step, the MMC determining whether to request for activating the RTM based on a user request is that: by detecting the handle switch signal coupled to the handle switch, the MMC can recognize the open/close state of the top handle; in this embodiment, the top handle being closed indicates that the RTM is requested to be activated, i.e., the load circuit of the RTM is expected to be supplied with the load power, and the top handle being open indicates that the RTM is not requested to be activated, i.e., the RTM load circuit is not expected to supplied with the load power.

Step 1003: The MMC communicates with the IPMC of the FRB via the IPMB, and requests for supplying the load power of the RTM.

Step 1004: The IPMC of the FRB determines whether the load power demand of the RTM has been allotted in advance. If yes, step 1008 and its following steps are executed; otherwise step 1005 and its following steps are executed.

Step 1005: The IPMC of the FRB and the MMC of the RTM interact on the load power demand of the RTM via the IPMB.

In this step, since the IPMC of the FRB does not determine the requirement for load power of the RTM in advance, they need to interact on the load power demand in this step.

Step 1006: The IPMC of the FRB negotiates about power demand via the IPMB with the shelf management controller of the shelf manager.

In this step, the IPMC of the FRB negotiates about power demand with the shelf manager once again based on the load power demand data for the RTM, which is obtained through the interaction with the MMC of the RTM.

Step 1007: The shelf management controller of the shelf manager permits the power demand, and the IPMC of the FRB increases distribution of the RTM load power.

Step 1008: The IPMC of the FRB enables the load power "enabled" signal, and outputs it to the load power conversion/control module of the RTM.

In this embodiment, the control signal for controlling the power conversion/control module to provide the load power is the same as that in the first embodiment, and will be not elaborated here.

Step 1009: The load power conversion/control module of the RTM supplies the load power, the RTM is activated, and the process is terminated.

Step 1010: The IPMC of the FRB does not enable the load power "enabled" signal.

Step 1011: The load power conversion/control module of the RTM does not supply the load power, the RTM is not activated, and the process is terminated.

As can be seen from the above process of method, steps 1002-1011 are the detailed operations of step 620 in the general method flowchart shown in FIG. 6. In this embodiment, whether the load power conversion/control module of the RTM is permitted to supply the load power is determined based on the state of the open/close state of the top handle and the result of interaction with the IPMC, so as to control the output of the big load current. Further, in this embodiment, the load power demand of the RTM is determined by the negotiation between the IPMC and the MMC, which helps to improve the exploitation efficiency of shelf power resource.

In this embodiment, a manner of the determining whether to request for activating the RTM based on a user request in the step 1002 is to sense the user request by use of the handle switch. There are also other manners to perform this function, for example, a user inputs control command to the IPMC of the FRB to request for activating the RTM in the step 1002. In this case, steps 1003-1007 may be omitted.

The above is the process of the method for power management and control of the ATCA system according to this embodiment. This embodiment further provides a device of power management and control of the ATCA system to implement the above method.

Figure 11:
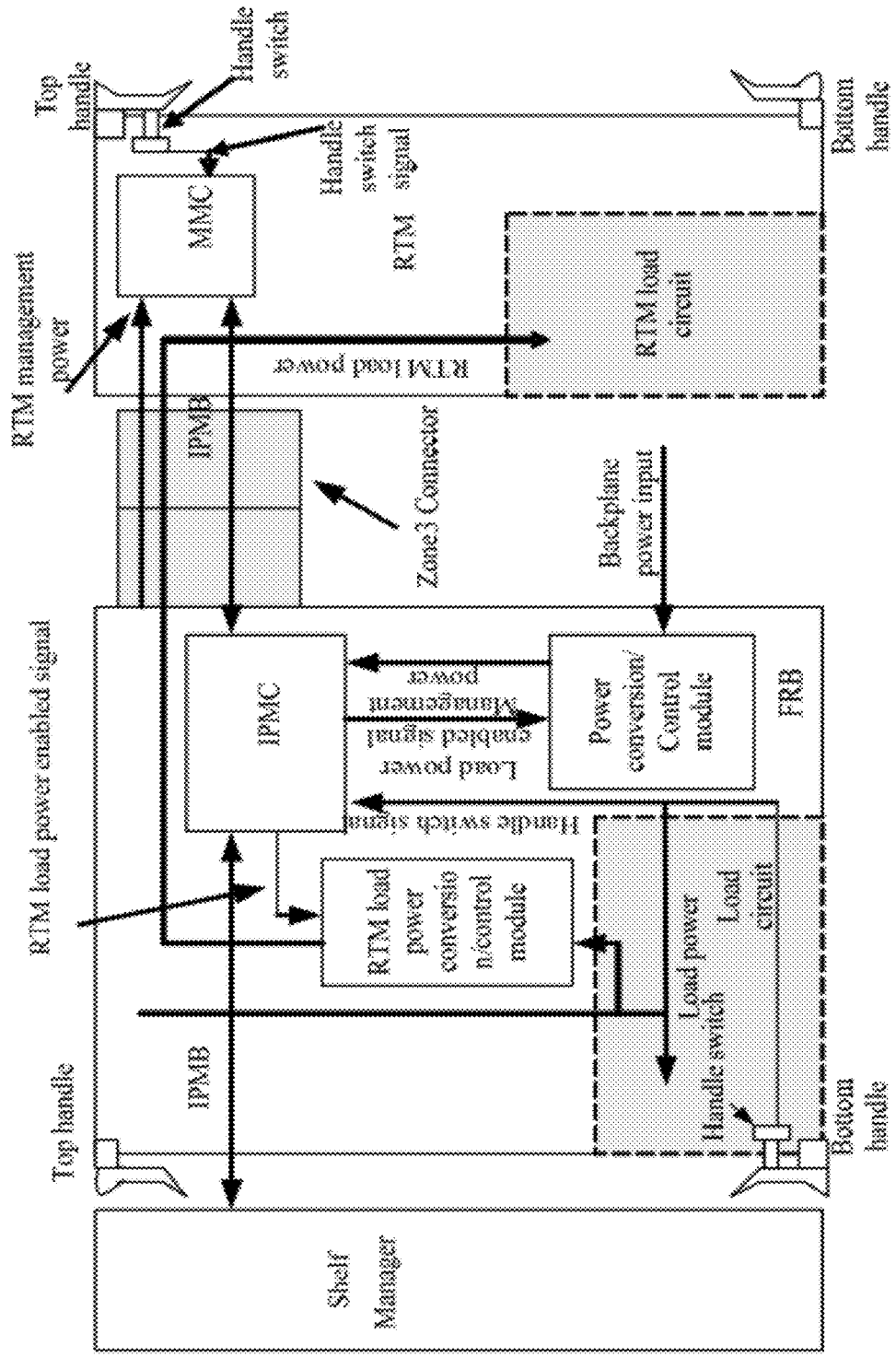
FIG. 11 is a structure diagram of a device for power management and control of the ATCA system according to the second embodiment of the present invention.

FIG. 11 is a structure diagram of a device for power management and control of the ATCA system according to the second embodiment. As shown in FIG. 11, the device includes the FRB, the RTM and the shelf manager. The FRB includes an IPMC, a power conversion/control module, a handle switch, a load circuit, a Zone 3 connector and a conversion/control module for RTM load power. The RTM includes the MMC, a handle switch, an RTM load circuit and the Zone 3 connector. The conversion/control module for the RTM load power is an embodiment of the second power conversion/control module 702 of the device shown in FIG. 7. The IPMC, MMC and the handle switch constitute the control circuit 703 in the device shown in FIG. 7.

In this device, the load power supplied by the power conversion/control module in FRB is divided to form a power of the RTM. This power of the RTM is divided into RTM management power and RTM load power. The RTM management power is supplied, without control, to management related circuits of the RTM, such as the MMC, via the Zone 3 connector. The RTM load power is supplied to a load circuit of the RTM after passing through the conversion/control module for the RTM load power which is added in the FRB. The supply of the load power is controlled by the IPMC. The control signal is a load power "enabled" signal output from the IPMC to the conversion/control module for the RTM load power. Only when the IPMC has enabled the load power "enabled" signal of the conversion/control module for the RTM load power, can the load circuit of the RTM get the RTM load power. Additionally, whether the IPMC outputs the load power "enabled" signal is controlled based on detection of the handle switch signal coupled to the handle switch by the MMC. The handle switch can be installed at the top handle or the bottom handle of the RTM. The MMC in the RTM can recognize the open/close state of the handle by detecting the handle switch signal. Based on the open/close state, it then communicates with the IPMC of the FRB via the IPMB provided by the Zone 3 connector, and informs the IPMC whether to output the load power "enabled" signal.

In the above embodiment of the device, the management power of the RTM is obtained by dividing the load power supplied by the power conversion/control module of the FRB. In actual practices, the management power of the RTM can also be obtained by dividing the management power supplied by the power conversion/control module of the FRB, and be supplied to the MMC of the RTM via the Zone 3 connector.

In the above device, the user request information is provided by the state of the handle switch, but it can also be provided in the manner that a user inputs control command to the IMPC. In this case, the control circuit 703 of the device shown in FIG. 7 is constituted by the IPMC and MMC of the device shown in FIG. 11. The IPMC controls the supply of the load power in the RTM power conversion/control module based on the user request.

With the above method and device, the RTM can be plugged/unplugged in the case that the FRB operates normally. The detailed process of the plugging/unplugging is described as follows.

(I). Plug in the RTM when the FRB operates normally.

1. The RTM is plugged in the slot position, management related circuits of the RTM, such as the MMC, are supplied with the RTM management power and are powered normally, while at this moment, the load circuit of the RTM is not supplied with the load power of the RTM, and the RTM is in the M1 state of the single board being inactivated.

2. The handle of the RTM is closed; after the MMC of the RTM detects that the handle is closed, it communicates with the IPMC of the FRB via the IPMB, and interacts on the operating state management of the RTM, and requests for supplying the load power of the RTM.

3. If when FRB is initially plugged into the ATCA shelf and the intelligent management controller of the FRB negotiates about the power demand with the shelf management controller, the load power demand of the plugged RTM is allotted in advance, then skip to step 4. Otherwise, the MMC of the RTM needs to interact about load power demand of the RTM with the IPMC of the FRB via the IPMB. Based on the demand data for the RTM load power which is obtained by the interaction, the IPMC of the FRB negotiates about power demand via the IPMB with the shelf management controller again, and increases distribution of the RTM load power upon getting permission from the shelf management controller.

4. The IPMC of the FRB enables the RTM load power "enabled" signal, the RTM load power is supplied by the RTM load power conversion/control module, the RTM load circuit obtains the supply of the RTM load power, the RTM is activated and enters M4 state of normal operation.

In the above process of plugging the RTM, steps 2-3 can be altered as: a user inputting to IPMC the control command to request for activating the RTM, the IPMC communicates via the IPMB with the MMC and interacts on operating state management of the RTM.

(II). Unplugging the RTM when both the FRB and RTM operate normally.

1. The handle of the RTM is open, the MMC of the RTM communicates via IPMB with the IPMC of the FRB and interacts about the operating state management of the RTM, and requests for unplugging the RTM.

2. The IPMC of the FRB controls the RTM load power conversion/control module with the RTM load power "enabled" signal, turns off the supply of the RTM load power, and the RTM enters M1 state of single board being inactivated. If necessary, at this time, the IPMC of the FRB can also negotiate about power demand with the shelf management controller via IPMB, release the RTM load power demand, so as to improve the exploitation efficiency of the shelf power resource.

3. The RTM is unplugged.

As can be seen from the above, the difference of this embodiment from the first embodiment is that, the power conversion/control module that controls the supply of the RTM load power is located in the FRB, and therefore there're also modifications on forming control signal of the power conversion/control module. Also, the RTM load power having big current can be supplied under control, and the hot swap of the RTM can be supported in the case that the FRB operates normally. Additionally, the negotiation about the RTM load power demand can be also supported, so that the power resource can be efficiently exploited.

Third Embodiment

In this embodiment, the second power conversion/control module added in the single board is provided in the FRB, controls the supply of the RTM load power and the RTM management power, and is referred to as an RTM power conversion/control module. A handle switch is added at the top handle of R the TM and controls whether to supply power to the load circuit of the RTM.

Figure 12:
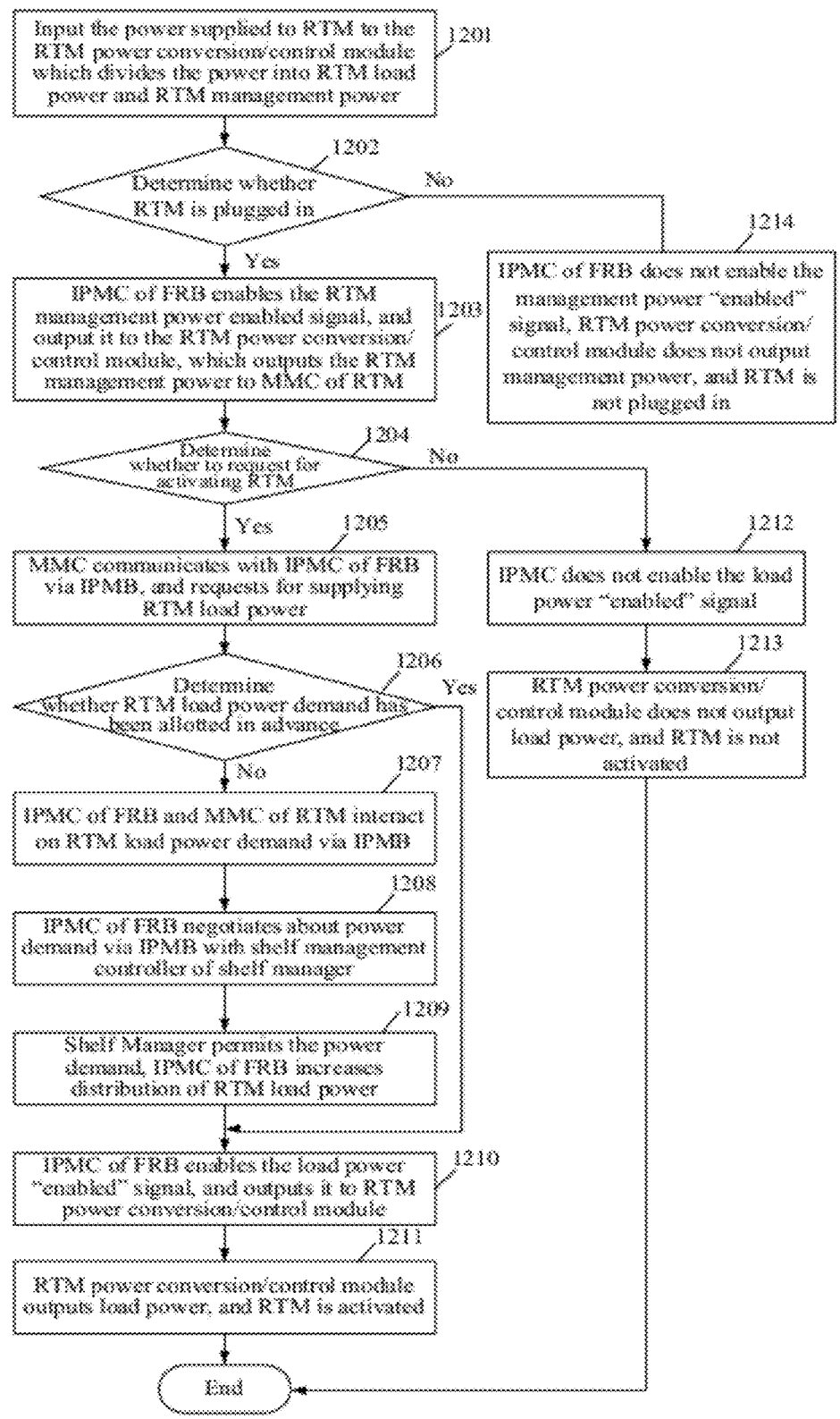
FIG. 12 is a flowchart of a method for power management and control of the ATCA system according to the third embodiment of the present invention.

FIG. 12 is a flowchart of the method for power management and control of the ATCA system according to the third embodiment of the present invention. As shown in FIG. 12, the method includes:

Step 1201: The power supplied to the RTM is input to the RTM power conversion/control module, which divides the power into the RTM load power and the RTM management power.

Step 1202: The IPMC of the FRB detects the state of the RTM "in position" signal, and determines whether the RTM is plugged in position. If yes, step 1203 and its following steps are executed; otherwise, step 1214 is executed.

In this embodiment, an RTM "in position signal" is added, and is supplied by the RTM via the Zone 3 connector to the IPMC of the FRB. The IPMC of the FRB can recognize whether the RTM is plugged in by detecting the state of the "in position" signal.

Step 1203: The IPMC of the FRB enables the RTM management power "enabled" signal, and output this signal to the RTM power conversion/control module, which supplies the RTM management power to the MMC of the RTM.

Step 1204: The MMC of the RTM determines whether to request for activating the RTM according to a user request. If yes, step 1205 and its following steps are executed; otherwise step 1212 and its following steps are executed.

In this step, the determining whether to request for activating the RTM according to a user request is the same as that of the second embodiment, and will not be elaborated here any more.

Step 1205: The MMC communicates with the IPMC of the FRB via the IPMB, and requests for supplying the RTM load power.

Step 1206: The IPMC of the FRB determines whether the RTM load power demand of the RTM has been allotted in advance. If yes, step 1210 and its following steps are executed; otherwise step 1207 and its following steps are executed.

Step 1207: The IPMC of the FRB and the MMC of the RTM interact on the load power demand of the RTM via the IPMB.

In this step, as the IPMC of the FRB does not determine the requirement of load power of the RTM in advance, both of them interact on the load power demand in this step.

Step 1208: The IPMC of the FRB negotiates on power demand via the IPMB with the shelf management controller of the shelf manager.

In this step, the IPMC of the FRB negotiates about power demand with the shelf manager once again based on the demand data for the RTM load power which is obtained through the interaction with the MMC of the RTM.

Step 1209: The shelf management controller of the shelf manager permits the power demand; and the IPMC of FRB increase distribution of the RTM load power.

Step 1210: The IPMC of the FRB enables the load power "enabled" signal, and outputs it to the RTM power conversion/control module.

Step 1211: The RTM power conversion/control module supplies the load power, the RTM is activated, and the process is terminated.

Step 1212: The IPMC of the FRB does not enable the load power "enabled" signal.

Step 1213: The RTM power conversion/control module does not supply the load power, the RTM is not activated, and the process is terminated.

Step 1214: The IPMC of the FRB does not enable the management power "enabled" signal, the RTM power conversion/control module does not supply the management power, the RTM is not plugged in, and the process is terminated.

As can be seen from the above process of method, steps 1203-1212 are detailed operations of step 620 in the general method flowchart shown in FIG. 6. In this embodiment, whether the RTM power conversion/control module is permitted to supply the load power is determined based on the open/close state of the top handle and the result of interaction with the IPMC, so as to control the output of the big load current. Additionally, in this embodiment, the RTM load power demand is determined based on the negotiation between the IPMC and MMC, so that the exploitation efficiency of the shelf power resource can be improved.

Moreover, in this embodiment, the supply of the RTM management power is controlled, which further improves the exploitation efficiency of the power resource and safety of the device.

In this embodiment, in step 1204, a manner of the determining whether to request for activating the RTM based on a user request is to sense the user request via the handle switch. There are also other manners to perform the function, for example, in step 1204, a user inputs a control command to the IPMC of the FRB to request for activating the RTM. In this case, steps 1205-1209 can be omitted.

The above is the process of the method for power management and control of the ATCA system according to this embodiment. This embodiment further provides a device of power management and control of the ATCA system to implement the above method.

Figure 13:
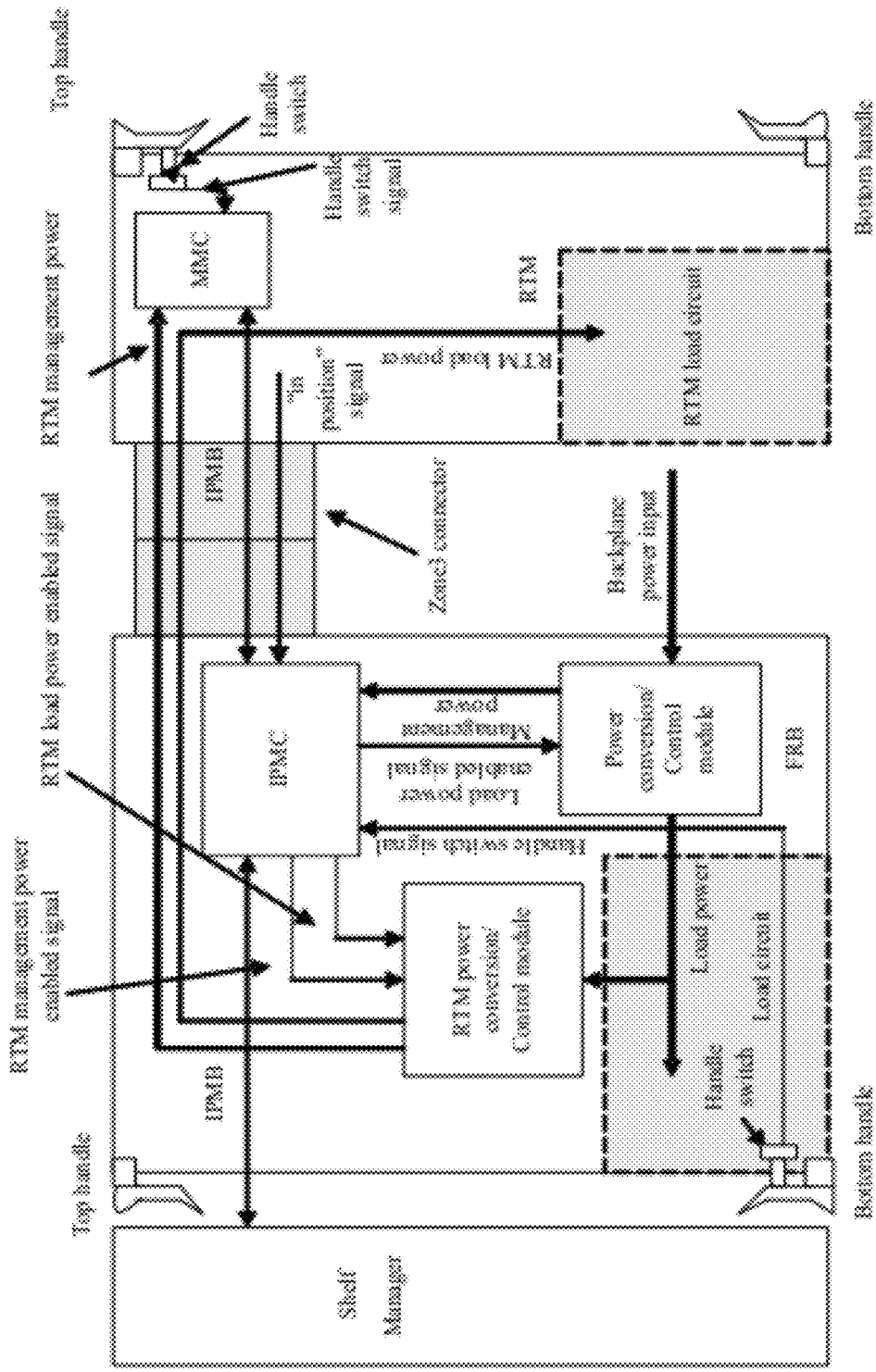
FIG. 13 is a structure diagram of a device for power management and control of the ATCA system according to the third embodiment of the present invention.

FIG. 13 is a structure diagram of a device for power management and control of the ATCA system according to the third embodiment of the present invention. As shown in FIG. 13, the device includes the FRB, the RTM and the shelf manager. The FRB includes an IPMC, a power conversion/control module, a handle switch, a load circuit, Zone 3 connector, and RTM power conversion/control module. The RTM includes an MMC, a handle switch, an RTM load circuit, and a Zone 3 connector. The RTM power conversion/control module is an implementation of the second power conversion/control module 702 of the device shown in FIG. 7.

The IPMC, MMC and the handle switch constitute an implementation of the control circuit 703 of the device shown in FIG. 7.

In this device, the load power supplied by the power conversion/control module of FRB is divided to form RTM power which is supplied to an RTM power conversion/control module. The RTM power conversion/control module supplies the divided RTM management power and RTM load power. The supply of the divided RTM management power and RTM load power are under control by the control signals which are output from the IPMC of the FRB to the RTM power conversion/control module, including the RTM management power "enabled" signal and the RTM load power "enabled" signal. The RTM management power enters the RTM via the Zone3 connector and then is supplied to the MMC directly. The RTM load power enters the RTM via the Zone3 connector and then is supplied to the RTM load circuit directly. Additionally, in this device, an RTM "in position signal" is provided, and is supplied by the RTM via the Zone 3 connector to the IPMC of the FRB. The IPMC can recognize whether the RTM is plugged in a corresponding slot by detecting the state of the "in position" signal, and in turn controls whether to enable the RTM management power "enabled" signal. The enabling control of the RTM load power "enabled" signal is the same as that of the second embodiment, and will not be elaborated here any more.

In the implementation of the device according to this embodiment, the management power of the RTM is obtained by dividing the load power supplied by the power conversion/control module of FRB and passing it through the RTM power conversion/control module. In actual practices, the management power of the RTM can also be obtained by dividing the management power supplied by the power conversion/control module of FRB and passing it through the RTM power conversion/control module.

In this device, the user request information is provided by means of the states of the handle switch state, but it can also be provided in the manner of the user inputting control command to the IMPC. In this case, the control circuit 703 of the device shown in FIG. 7 is constituted by the IPMC and MMC of the device shown in FIG. 13. The IPMC controls the supply of load power of the RTM power conversion/control module based on the user request.

With the above method and device, the RTM can be plugged/unplugged in the case of the FRB operating normally. The detailed process of the plugging/unplugging is described as follows.

(I). Plug in the RTM when the FRB operates normally.

1. The RTM is plugged in the slot position, the IPMC of the FRB of the corresponding slot detects the RTM "in position" signal and recognizes that the RTM is plugged in. The IPMC of the FRB controls the RTM power conversion/control module to supply the RTM management power, by enabling the RTM management "enabled" signal. The management related circuits of RTM, such as the MMC, are supplied with the RTM management power, while the load circuit of the RTM is not supplied with the RTM load power, and the RTM is in the M1 state of the single board being inactivated.

2. The handle of the RTM is closed; after the MMC of the RTM detects that the handle is closed, it communicates with the IPMC of the FRB via the IPMB, interacts about the RTM operating state management, and requests for supplying the RTM load power.

3. If when the FRB is initially plugged into the ATCA shelf and the intelligent management controller of the FRB negotiates about power demand with the shelf management controller, the load power demand of the plugged RTM is allotted in advance, then skip to step 4; otherwise, the MMC of RTM needs to interact about the RTM load power demand with the IPMC of the FRB via the IPMB. Based on the demand data for the RTM load power obtained through the interaction, the IPMC of the FRB negotiates about power demand via the IPMB with the shelf management controller once again, and increases distribution of the RTM load power upon getting permission from the shelf management controller.

4. The IPMC of the FRB enables the RTM load power "enabled" signal, the RTM power conversion/control module supplies the RTM load power, the RTM load circuit is supplied with the RTM load power, the RTM is activated and enters M4 state of normal operation.

In the above process of plugging the RTM, steps 2-3 may be altered as: a user inputting to the IPMC a control command that requests for activating the RTM, and the IPMC communicates via the IPMB with the MMC and interacts about the RTM operating state management.

(II). Unplug the RTM when both the FRB and RTM operate normally.

1. The handle of the RTM is open, the RTM power conversion/control module communicates via the IPMB with the IPMC of the FRB and interacts about the RTM operating state management, and requests for unplugging the RTM.

2. The IPMC of the FRB controls the RTM power conversion/control module by use of the RTM load power "enabled" signal, and turns off the supply of the RTM load power; and the RTM enters M1 state of the single board being inactivated. If necessary, at this time, the IPMC of the FRB can also negotiate about power demand with the shelf management controller via the IPMB, release the load power demand of the RTM, so as to improve the exploitation efficiency of the shelf power resource.

3. The RTM is unplugged. By detecting the state of the "in position" signal, the IPMC of the FRB of the corresponding slot recognizes that the RTM is unplugged, and controls the RTM power conversion/control module to turn off the supply of the RTM management power by use of the RTM management power "enabled" signal.

As can be seen from the above, this embodiment controls the supply of the load power in the same manner as the second embodiment, can achieve the purpose that the RTM load power having a big current is supplied under control, and supports hot swap of the RTM in the case of the FRB operating normally. Additionally, this embodiment can support the negotiation about the RTM load power demand, and efficiently exploit the power resource. The difference between this embodiment and the second embodiment is an additional control of supply of the RTM management power, so as to further improve the exploitation efficiency of the power resource and the safety of the device.

The above three embodiments all explain, by the example of the RTM, detailed implementations of the methods and devices for power management and control according to the present invention. The above stated methods and devices for power management and control are also applicable for the front transition module (FTM) in the ATCA 300 standard, to manage the power supply of the FTM in the ATCA 300 standard.

The FTM load power or FTM management power in the ATCA 300 standard can be managed and controlled, in the case that management related circuits, such as a handle switch, MMC, etc., are added to the FTM in the ATCA 300 standard; various types of power conversion/control modules are added to the FTM or the FRB in the ATCA 300 standard according to different application schemes, for example, a power conversion/control module is added to the FTM in the ATCA 300 standard, or a load power conversion/control module of the FTM is added to FRB, or an FTM power conversion/control module is added in FRB; and, through the Zone 3 connector of the FRB and the Zone 4 connector of the FTM and the backplane between them, the power, management and control signal of the FRB and the RTM of the ATCA in the original scheme that are coupled through the Zone 3 connector are supplied.

The above merely illustrates preferred embodiments of the present invention, and is not intended to limit the scope of the present invention. Any modification, equivalent substitution and improvement within the spirit and scope of the present invention are intended to be included in the scope of the present invention.

The invention claimed is:

1. An Advanced Telecom Computing Architecture (ATCA) system, the system comprising:
   a Rear Transition Module (RTM) or Front Transition Module (FTM);
   a Front Board (FRB) comprising a first power conversion/control module that supplies power to the FRB and the RTM or FTM;
   a control circuit configured to output a control signal; and
   a second power conversion/control module configured to supply power from the first power conversion/control module to the RTM or FTM according to the control signal;
   wherein the power supplied by the first power conversion/control module to the RTM or FTM comprises management power and load power, and the load power is supplied to the second power conversion/control module; and
   the second power conversion/control module supplies the load power to the RTM or FTM according to the control signal;
   wherein the control circuit comprises:
   an Intelligent Platform Management Controller (IPMC) configured to receive a control command from a user, and output a control signal requesting activation of the RTM or FTM according to the control command; and
   a Module Management Controller (MMC) configured to output to the second power conversion/control module the control signal that permits supplying the load power according to the control signal requesting activation of the RTM or FTM.

2. The system of claim 1, wherein the control circuit comprises:
   a handle switch configured to output a signal requesting activation of the RTM or FTM when the RTM or FTM is plugged into a corresponding slot on the FRB and a handle of the RTM or FTM is closed, wherein
   the MMC is configured to output a signal requesting supply of load power according to the signal requesting activation of the RTM or FTM, and
   the IPMC is configured to output to the second power conversion/control module the control signal that permits supplying the load power according to the signal requesting supply of load power.

3. The system of claim 1, wherein the IPMC is configured to receive a control command from a user, and output to the second power conversion/control module the control signal that permits supplying the load power according to the control command.

4. The system of claim 2, wherein the second power conversion/control module is located in the FRB.

5. The system of claim 1, wherein the second power conversion/control module divides the power supplied by the first power conversion/control module to the RTM or FTM into management power and load power, and supplies the management power and the load power to the RTM or FTM according to the control signal.

6. The system of claim 5, wherein
the second power conversion/control module is located in the FRB,
the IPMC is configured to output the control signal that permits supplying the management power, if it is determined that the RTM or FTM is plugged in a corresponding slot on the FRB according to a state of "in position" signal in the RTM or FTM, and
the second power conversion/control module supplies the management power to the RTM or FTM according to the control signal that permits supplying the management power.

7. The system of claim 6, wherein the control circuit further comprises:
a handle switch configured to output the signal requesting activation of the RTM or FTM when the RTM or FTM is plugged into the corresponding slot on the FRB and a handle of the RTM or FTM is closed, wherein
the MMC is configured to output a signal requesting supply of load power according to the signal requesting activation of the RTM or FTM,
the IPMC outputs the control signal that permits supplying the load power according to the signal requesting supply of load power, and
the second power conversion/control module supplies the load power to the RTM or FTM according to the control signal that permits supplying the load power.

8. The system of claim 6, wherein
the IPMC receives a control command from a user, and outputs the control signal that permits supplying the load power according to the control command, and
the second power conversion/control module supplies the load power to the RTM or FTM according to the control signal that permits supplying the load power.

* * * * *